(12) United States Patent
Cloue et al.

(10) Patent No.: US 7,048,475 B2
(45) Date of Patent: May 23, 2006

(54) SYSTEM FOR DISTRIBUTION OF PULVERULENT MATERIAL WITH CONTROLLED GRAVIMETRIC FLOW RATES

(75) Inventors: Christian Cloue, Gardanne (FR); Raymond Roumieu, Aix en Provence (FR)

(73) Assignee: Aluminium Pechiney, Paris Cedex (FR)

( * ) Notice: Subject to any disclaimer, the term of this patent is extended or adjusted under 35 U.S.C. 154(b) by 18 days.

(21) Appl. No.: 10/492,193

(22) PCT Filed: Oct. 21, 2002

(86) PCT No.: PCT/FR02/03598

§ 371 (c)(1),
(2), (4) Date: Apr. 19, 2004

(87) PCT Pub. No.: WO03/035519

PCT Pub. Date: May 1, 2003

(65) Prior Publication Data
US 2004/0247400 A1    Dec. 9, 2004

(30) Foreign Application Priority Data
Oct. 26, 2001 (FR) .................................. 01 13909

(51) Int. Cl.
*B65G 53/22* (2006.01)
(52) U.S. Cl. .................... 406/155; 406/89; 406/93; 406/123
(58) Field of Classification Search .................. 406/89, 406/93, 123, 154, 155, 191, 192
See application file for complete search history.

(56) References Cited

U.S. PATENT DOCUMENTS

| 3,268,264 | A | * | 8/1966 | Squires ........................ 406/89 |
| 3,870,374 | A |   | 3/1975 | Wentzel, Jr. et al. |
| 4,016,053 | A | * | 4/1977 | Stankovich et al. ........ 205/392 |
| 4,450,053 | A | * | 5/1984 | Merz et al. ................. 205/392 |
| 4,659,263 | A | * | 4/1987 | Hanrot et al. ................. 406/89 |
| 4,692,068 | A | * | 9/1987 | Hanrot et al. ................. 406/89 |
| 4,747,732 | A | * | 5/1988 | Hanrot et al. ................. 406/89 |
| 4,930,691 | A | * | 6/1990 | Nagell ........................ 222/630 |
| 4,938,848 | A | * | 7/1990 | Raines et al. ............... 205/392 |
| 5,299,694 | A |   | 4/1994 | Rambaud |
| 5,360,297 | A | * | 11/1994 | Enstad et al. ................. 406/89 |
| 6,382,881 | B1| * | 5/2002 | Gasquet et al. ............ 406/197 |
| 6,402,437 | B1| * | 6/2002 | Gasquet et al. ............ 406/198 |
| 6,749,373 | B1| * | 6/2004 | Von Geldern et al. ........ 406/23 |

FOREIGN PATENT DOCUMENTS

| EP | 0 190 092 | * | 8/1986 |
| EP | 0 506 180 | * | 9/1992 |
| EP | 506180    |   | 9/1992 |
| FR | 2 692 498 | * | 12/1993 |
| WO | 84/01560  | * | 4/1984 |
| WO | 85/04676  | * | 10/1985 |
| WO | 99/58435  | * | 11/1999 |
| WO | 99/62800  | * | 12/1999 |

* cited by examiner

*Primary Examiner*—Douglas Hess
(74) *Attorney, Agent, or Firm*—Dennison, Schultz, Dougherty & MacDonald

(57) ABSTRACT

Method for conveying a pulverulent material making it possible to divide said pulverulent material, from a single storage capacity (10), between several conveyors (50) with a controlled flow rate in each of said conveyors, characterized in that said storage capacity is linked to said conveyors by at least one aero-pipe (30) and in that a hyperdense fluidized meter (40), is connected to said aero-pipe, said hyperdense fluidized meter being intended to feed each of the conveyors.

4 Claims, 2 Drawing Sheets

SYSTEM FOR DISTRIBUTION OF PULVERULENT MATERIAL WITH CONTROLLED GRAVIMETRIC FLOW RATES

FIELD OF THE INVENTION

The present invention relates to a method for conveying pulverulent material enabling said pulverulent material arriving from an upstream conveyor to be divided between several downstream conveyors with a controlled flow in each of the downstream conveyors. In particular, it relates to feeding alumina, in controlled quantities, to the reactors of gas processing centres making it possible to capture the fluorine-containing effluents issued from the tanks for aluminium production by fused-salt electrolysis.

DESCRIPTION OF RELATED ART

The gases issuing from the tanks for aluminium production by fused-salt electrolysis contain a significant proportion of fluorine gas and fluorine-containing compounds. In order to avoid rejection of the fluorine and fluorine-containing compounds into the atmosphere, alumina in powder form is projected into said gases issuing from the tanks. The alumina adsorbs the fluorine, which is doubly beneficial: gas ejection into the atmosphere is less aggressive for the environment and the alumina, richer in fluorine, has a lower solubility temperature in cryolite.

The contact between the alumina and the gases issuing from the tanks takes place in an ensemble of devices called reactors and grouped together in one or several centres for gas processing. A reactor of this type is described in patent application FR 2 692 497 (PROCEDAIR). Despite the high volume (typically of the order of 1000 m$^3$) taken up by such devices, it is necessary to use several of them to adsorb the major part of the fluorine and fluorine-containing components contained in the gases issuing from the electrolysis tanks. Thus, each gas processing centre, associated with a certain number of electrolysis tanks must, according to the operational level of said tanks, be fed with a more or less high quantity of pulverulent alumina. As a result the quasi-totality of the alumina intended for production of aluminium must first pass through one or other of the gas processing centres before being used to supply one or another of the electrolysis tanks.

The alumina is initially stored in a first tank, with typical capacity of the order of 10 000 tons. It is then divided and directed towards the gas processing centres. It must be ensured that the quasi-totality of the fluorine and fluorine containing compounds contained in the gas entering a reactor of a gas processing centre is going to be retained by the alumina. This necessitates controlling the flow rate of the alumina injected into each reactor of a gas processing centre. Once treated, the "fluorined" alumina from the various gas processing centres is collected, mixed and then stocked in a second storage tank, from which the different electrolysis tanks are supplied.

Patent applications WO84 01560, WO85 04676, WO99 58435 and WO99 62800 describe the conveyor devices, called "aero-pipes" which make it possible to convey, under potentially fluidisation form—also called hyperdense fluidised—the alumina from the second storage tank (above-mentioned) and the electrolysis tanks. Transport of alumina in the form of hyperdense fluidised bed, perfected by the applicant, is a particularly efficient method which stands out from traditional methods for conveying pulverulent material. In these traditional methods, the conveyor used, called an "aero-guide", comprises little pulverulent material and is crossed by gaseous currents with high kinetics whereas the method for conveying by hyperdense fluidised bed is characterised by a conveyor almost completely filled by pulverulent material in which a fluidising gas circulates at very low speed.

In the conveying method by hyperdense fluidised bed, circulation of the pulverulent material is carried out by a succession of micro-slides generated at the level of the feed of the electrolysis tank and which "climb up" in the aero-pipes towards the storage tank. To facilitate this climbing of micro-slides, the fluidisation gas is injected under pressure through a porous wall separating the aero-pipe into two channels, said fluidisation gas circulating at very low speed in the aero-pipe and exiting through a balancing and degassing column. Concerning the pulverulent material—there is no attrition because of the low speed of the fluidisation gas circulating in the aero-pipe—the method for conveying by hyperdense fluidised bed is known at present as an economic and reliable conveying method adapted in particular to the transport and distribution of pulverulent material between relatively distant points insofar as one does not require a precise dose of the distributed material.

Moreover, for controlling the flow rate of the pulverulent material, in EP 0 190 082 the applicant proposed a device which will afterwards be called "hyperdense fluidised meter". This device comprises a housing, a column allowing the housing to be supplied with pulverulent material from a storage means and an evacuation means for said pulverulent material. The housing, like the aero-pipe, is in two parts to allow the pulverulent material to be put into a potential fluidisation state. The evacuation means comprise an orifice and an outlet nozzle with internal diameter greater than that of the orifice. The evacuation means are set at a sufficient distance from the supply column so that, in the absence of fluidisation, it cannot be reached by the foot of the natural angle of repose. When the fluidisation gas is introduced, it is observed that for a given pulverulent material and a given nozzle, there exists a bi-unique relationship between the outlet flow rate of the pulverulent material and the fluidisation pressure imposed in said hyperdense fluidised meter.

When the fluidisation pressure is nil in the housing, the pulverulent material stocked in the storage means descends by gravity in a column opening out into the second part of the housing, forming an angle of repose on the porous wall. The outlet orifice is located immediately above the level of the porous wall at a distance such that it is not reached by the foot of the angle of repose when the fluidisation pressure in the housing is nil. When the fluidisation gas is injected, the pulverulent material of the angle of repose becomes fluid and the upper part of the housing is filled with pulverulent material in such a way that the latter can pass through the outlet orifice.

Despite this, up until now it has not been possible to convey alumina under the form of a hyperdense fluidised bed upstream from the second storage tank because it was necessary to measure the overall flow and distribute the alumina into the different conveyors aimed at feeding the reactors of the gas processing centres. These two functions could only be fulfilled if the pulverulent material was fluidised under the effect of a gas circulating at high speed. The conveyors were traditional conveyors, of the aero-guide type.

Thus, for continuous measurement of the overall flow of pulverulent alumina one used, for example, a solid flowmeter like a Granumet DE 10 flowmeter proposed by the RAMSEY company. The latter operates on the principle of measurement of the impact force of the powder projected against a plate. Therefore the pulverulent material has to flow continuously and with minimum kinetic energy (i.e. not in short bursts, by micro-slides climbing up), which can only occur when it is transported by a gas circulating at high speed.

In the same way, concerning distribution of the alumina between a central storage tank and several reactors grouped together in one or several gas processing centres, prior art proposes several different devices but all of them require using a gas circulating at a sufficiently high speed to carry the pulverulent material through openings with calibrated cross-sections.

Thus U.S. Pat. No. 4,938,848 describes a distributing device comprising a chamber placed under the storage tank and crossed by a plurality of open conduits at the level of the chamber and inside which a gas is blown under pressure to carry the powder outside the chamber, inside said conduits. In this device as in the others, the alumina flow in each conduit can be controlled either by varying the pressure with which the gas is blown into the conduit or by modifying the surface area of the opening of the conduit in the chamber, for example by displacing a closure shutter more or less—which is called "beater" hereinafter—in front of said opening.

Thus, to ensure that the alumina enters each gas processing centre reactor with a sufficient flow to catch the maximum of fluorine and fluorine containing compounds before the gases are evacuated into the atmosphere, the devices of prior art comprise a solid flowmeter continuously measuring the total flow of alumina and then, downstream, a distribution housing provided with several calibrated orifices on its lateral wall. The alumina is fluidised with a fluidisation gas pressure such that it is carried through each of these orifices with a controlled flow, the control being carried out for example by varying the size of the opening of each orifice. Beyond each of these orifices, the alumina is led by an aero-guide towards a gas processing centre reactor.

Both the solid flowmeter and the distribution housing necessitate the use of a fluidisation gas circulating at high speed. Upstream and downstream from these devices, the aero-guides are to be found. In order to ensure a reliable supply of alumina without any irregularities, the aero-guides have a minimum slope of 6%, and preferably at least equal to 10%. Consequently, taking into account the lengths to be travelled, the device for feeding alumina in controlled quantities according to prior art has to be raised by several meters, typically 6 meters, relative to the alumina feed level of the gas processing centres. The extra cost involved in this elevation, imposed by the presence of aero-guides, can be estimated at nearly 10% of the total amount of the cost of the alumina feeding device for the electrolysis tanks.

The use of control and distribution devices for alumina flows requires a high fluidisation gas flow, which imposes big fluidisation gas compression installations and involves large gas and energy consumption. Furthermore, the high kinetics of the pulverulent material has harmful consequences for the problems of material attrition, and wear problems for the distribution housing, together with difficulties in regulating flow rates (difficulties in sliding the closure shutters for varying the surface areas of the openings calibrated from the distributor).

Furthermore, the obligatory presence of aero-guides downstream from the distribution housing imposes equipment set very high above the electrolysis tanks, because of the minimum slope of 6% to be respected. Therefore, very high investment is involved to produce installations for feeding gas processing centres with alumina.

The applicant therefore developed a more economical method for distributing alumina, easier to control and without the disadvantages mentioned above. This distribution method must be able to be applied to any other pulverulent material with fluidity comparable to that of alumina, said pulverulent material coming from a single storage capacity and having to be divided between several conveyors with controlled flow in each of these conveyors.

SUMMARY OF THE INVENTION

The aim of the present invention is a method for conveying pulverulent material making it possible to distribute said pulverulent material, from a single storage capacity, between several outlets, typically conveyors, with a controlled flow rate in each of said conveyors characterised in that said storage capacity is linked to said conveyors by at least one aero-pipe and in that each conveyor is fed by a hyperdense fluidised meter connected to said aero-pipe.

The aero-pipe is described in detail in WO84 01560 and WO85 04676. It is a conveyor, either horizontal or slightly inclined (preferably less than 2 degrees relative to the horizontal), provided with fluidisation means constituted by a first channel intended for the circulation of a gas and a second channel intended for the circulation of the pulverulent material, the two channels having a common porous wall, the first channel being provided with at least one gas feed tube making it possible to produce a pressure $p_f$ with the aim of potentially fluidising the pulverulent material filling the conveyor and the second channel being provided with at least one balancing column whose filling height balances the pressure $p_f$ of the potential fluidisation gas.

The aero-pipe can have a generally rectangular cross-section or, further, a generally circular cross-section. In this latter case, the first channel intended for circulating a gas and the second channel intended for circulating pulverulent material can be co-axial. Nonetheless, to obtain an aero-pipe at the lowest cost, preferably the first channel occupies the lower part of the conveyor, while the second channel occupies the upper part of the conveyor and the two parts are separated by a closely horizontal porous flat wall.

The hyperdense fluidised meter is described in detail in EP 0 190 082. It comprises a housing in two parts. The first part of the housing, located in the bottom of the housing, is intended for circulation of a fluidisation gas and the second part of the housing, located above the first, is intended for circulation of the pulverulent material. The two parts have a common closely horizontal porous wall. The first part is provided with at least one gas feed tube making it possible to produce a pressure $p'_f$ with the aim of potentially fluidising the pulverulent material filling the meter and the second part is provided with at least one balancing column whose filling height balances the pressure $p'_f$ of the potential fluidisation gas.

The second part of the housing is also linked to the storage capacity, not directly but through a vertical column, to the second channel of the aero-pipe. When the fluidisation pressure $p'_f$ is nil, the pulverulent material located in the second aero-pipe channel descends by gravity into a column opening out into the second part of the housing, forming a natural angle of repose on the porous wall. When the angle of repose is formed, the pulverulent material exiting through this aero-pipe column remains immobile since there is no reason for micro-slides nor for "climbing up" of the latter.

The evacuation means comprises an exit orifice located immediately above the level of the porous wall at a distance such that it is not reached by the foot of the angle of repose. The second part of the housing thus being filled, the fluidisation gas is sent in and the pressure level $p'_f$ is adjusted by means of a control means such as a valve. The gas diffuses through the porous wall towards the first part of the housing, and the pulverulent material of the angle of repose becomes fluid. The upper part of the housing and then the balancing column fill up with pulverulent material to a height H which depends on the pressure $p'_f$ of the fluidisation gas and the average density of the pulverulent material in the balancing column.

The outlet orifice is possibly provided with a nozzle forming a diaphragm, whose external part can be linked to the evacuation piping for the fluidised pulverulent material. The pulverulent material, in potential fluidisation state in the meter housing, can pass through the outlet orifice. It is renewed by successive micro-slides which "climb up" in cascade as far as the supply column of the hyperdense fluidised meter and beyond, in the second aero-pipe channel. Very locally, at the level of the orifice and directly downstream from it, each slide liberates a space sufficient for the pulverulent material to pass from the potential fluidisation state to the real fluidisation state thus ensuring, for a wide range of flows, an alumina supply equal to the outlet flow without any irregularities in this flow.

If the pressure $p'_f$ remains constant, the weight flow of pulverulent material remains remarkably constant. If said fluidisation pressure $p'_f$ is raised, the flow increases. If it is annulled, the pulverulent material no longer circulates and does not pass through the orifice. Thus, the flow of pulverulent material can be controlled uniquely by acting on the pressure $p'_f$ of the fluidisation gas, which is a much more flexible and sure means than that consisting of trying to make the closure shutters slide in front of an opening (the grooves acting as guide for the closure shutters are filled with pulverulent material, which does not help sliding; furthermore the rails soon become worn).

Preferably, the source and/or the means for adjusting the fluidisation pressure $p'_f$ in the meter is independent from that of the fluidisation pressure in the aero-piping. More preferably, each hyperdense fluidised meter has its own means for adjusting the pressure $p'_f$, making it possible to have greater operational flexibility, each of the conveyors thus being supplied with pulverulent material with a controlled flow-rate, adapted to the specific function of the conveyor.

According to the invention, there exists at least one aero-pipe between the storage capacity and the conveyors, each conveyor being fed by a hyperdense fluidised meter such as that described above. It is the aero-pipe itself which acts as distributor, the distribution function being fulfilled in delocalised fashion. The aero-pipe must have a sufficiently large cross-section for it to remain almost completely full continually, such that any displacement of pulverulent material only takes place through micro-slides. In these conditions, it is not necessary to control the overall flux of pulverulent material continually: it suffices for the storage capacity to be very big and for the aero-pipe to have a large cross-section.

Returning to the example of supplying processing centres for gases issuing from electrolysis tanks, the aero-pipe is linked at one of its ends with an elevated storage capacity for alumina and is provided with as many fluidised meters as here are gas processing reactors. These fluidised meters supply the aero-guides such as those with reference 32 in FR 2 692 497. Each hyperdense fluidised meter can be placed near each reactor for processing gases: in this way the aero-guide remains short and the difference in level imposed by the minimum slope of 6° of said aero-guide remains low. In order to reduce this distance as much as possible, one can produce a non-rectilinear aero-pipe or yet again, as in the following example, several aero-pipes communicating with each other.

As in WO99 58435, one can also create a fluidisation gas bubble in the upper part of the aero-pipe. In this way, the fluidisation gas can circulate more easily, thus improving the potential fluidisation conditions which must be fulfilled at every point of the aero-pipe.

DESCRIPTION OF THE PREFERRED EMBODIMENTS

Figure 1:
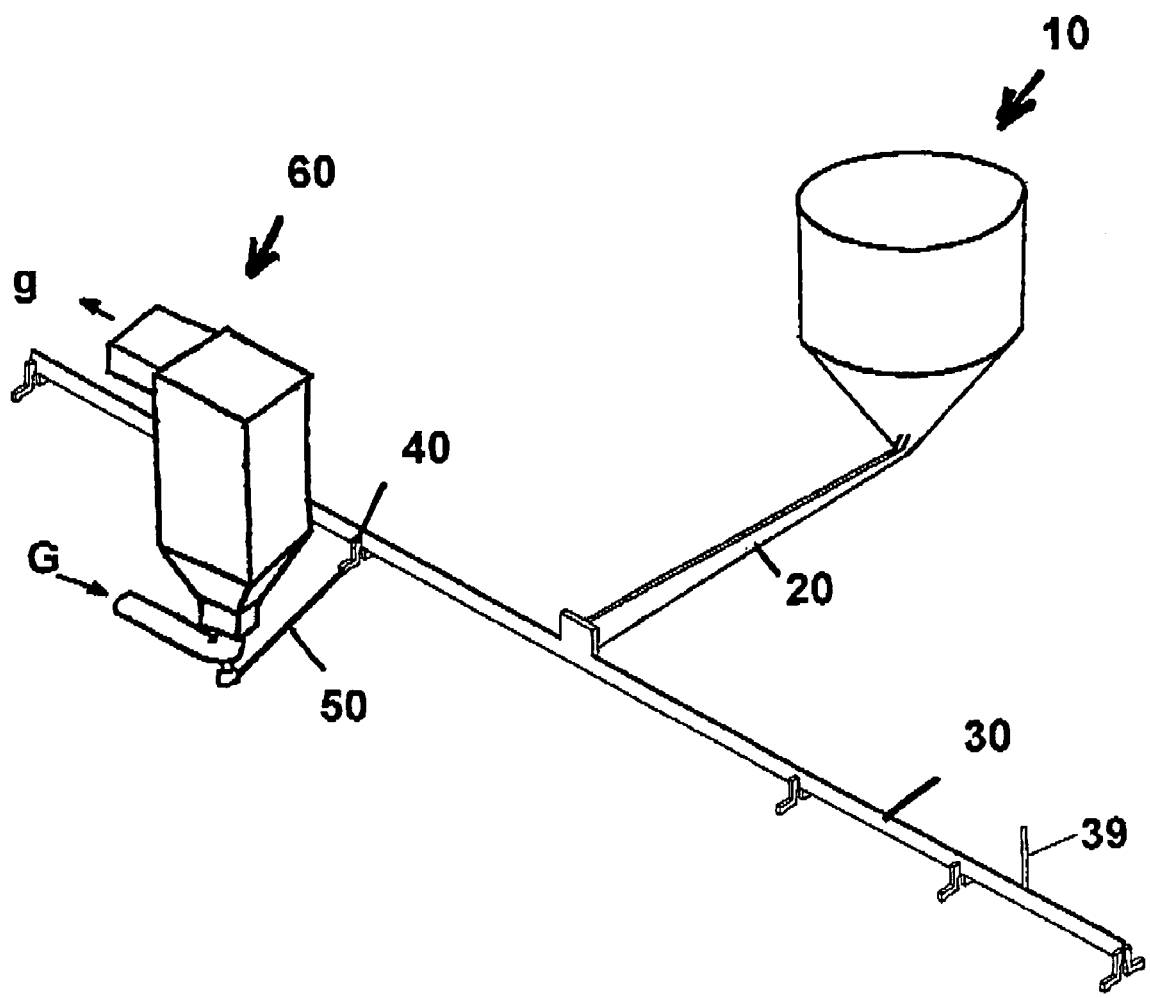
FIG. 1 shows an axonometric and diagrammatic view of a supply circuit in alumina for processing centres for gases issuing from fused-salt electrolysis tanks.
Figure 2:
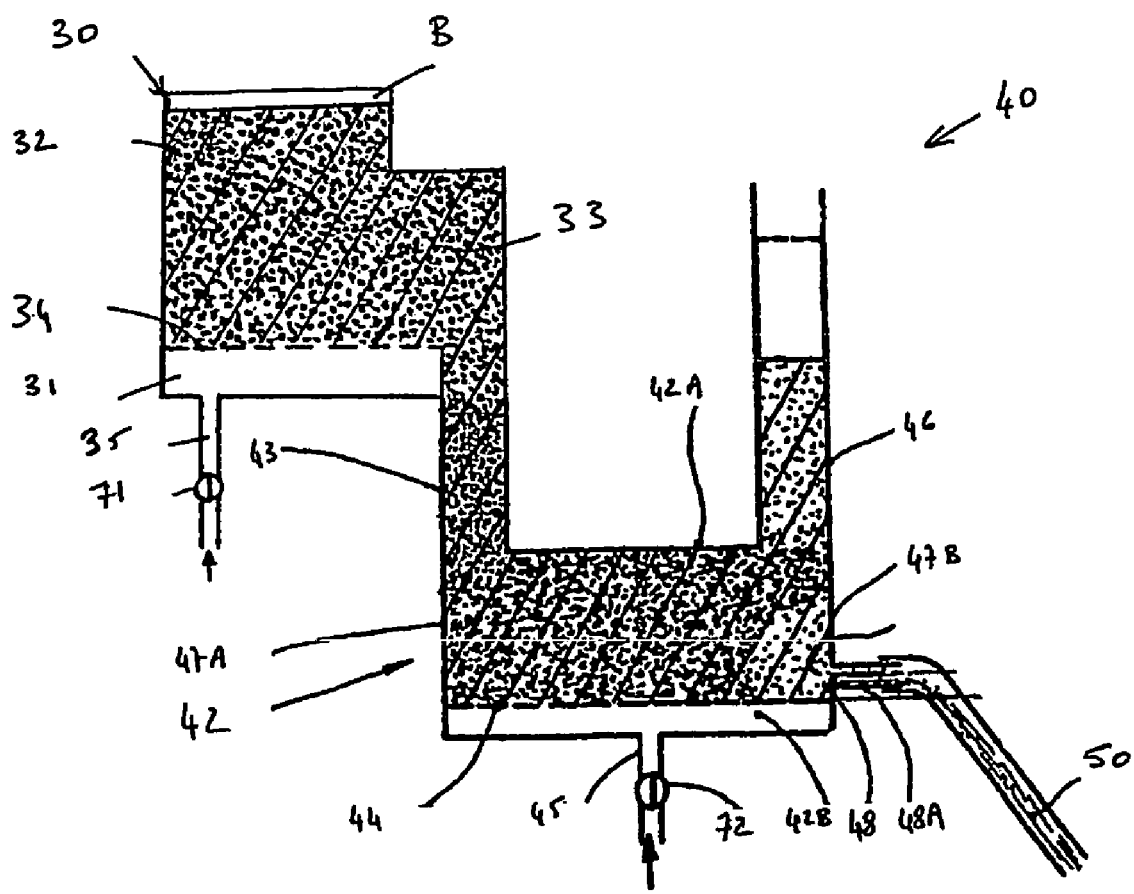
FIG. 2 shows a cross-section through a hyperdense fluidised meter connected to the aero-pipe.

In the example shown in FIGS. 1 and 2, it is a matter of supplying alumina to the twenty-four reactors—grouped together in two processing centres—needed for treating the gases issuing from more than 300 fused-salt electrolysis tanks. A single one of these reactors is shown in FIG. 1. It is associated with a certain number of tanks whose operation may be noticeably different from that of the neighbouring tanks and which consequently may emit effluent gases with very different flows. It is therefore a question of feeding each gas processing reactor with an alumina flow adapted to the flow rate of effluent gases emitted by the ensemble of tanks associated with said gas processing.

The alumina is brought from the first storage reservoir 10 to the gas processing reactors 60. Once treated, the "fluorine containing" alumina coming from the different gas processing reactors is collected, mixed and then stocked in a second storage reactor intended to feed the electrolysis tanks. This part is not shown in FIG. 1 but can easily be represented by making the "fluorine containing" alumina exit through the overflow 34 shown in the figure of FR 2 692 497 and by transporting it to the storage capacity 31 of the alumina supply installation for the electrolysis cells shown in the figure of WO85 04676.

The gases G issuing from the electrolysis tanks enter by a vertical conduit of the type referenced 26 in FR 2 692 497 and carry the alumina particles brought by the aero-guide 50 prolonged by a vertical tube coaxial with the conduit 26 of FR 2 692 497. The treated gases g are evacuated by the top of the processing reactor.

Each gas processing reactor 60 is supplied with alumina by an aero-guide 50, itself fed by a hyperdense fluidised meter 40 connected to the aero-pipe 30. The dozen fluidised meters are connected on the same aero-pipe 30 which itself is fed by the alumina coming from the first storage tank 10 through the intermediary of an upstream aero-pipe 20.

FIG. 2 shows a cross-section of the aero-pipe 30, at right angles to a branch connection linking it to a hyperdense fluidised meter. The aero-pipe 30 is a horizontal conveyor, provided with fluidisation means constituted by a first channel 31 intended for air circulation and by a second channel 32 intended for circulation of alumina. The two channels have a common porous wall 34. The first channel 31 is provided with an air supply tube 35 making it possible to produce a pressure $p_f$ of potential fluidisation. The second channel 32 is provided with at least one balancing column 39, shown in FIG. 1, whose filling height balances the pressure $p_f$ of potential fluidisation. Close to each gas processing reactor, the aero-pipe is provided with a branch connection 33 which puts the second channel 32 in communication with the supply column 43 of the hyperdense fluidised meter 40.

The hyperdense fluidised meter comprises a housing 42 in two parts. The first part 42B of the housing, located at the bottom of the housing, is intended for the circulation of fluidisation air and the second part 42A of the housing, located above the first, is intended for the circulation of the alumina. The two parts have a porous common wall 44, closely horizontal. The first part 42B is provided with a tube 45 for feeding air, making it possible to establish a potential fluidisation pressure $p'_f$ for alumina filling the meter, and the second part 42A is provided with a balancing column 46 with filling height balancing the pressure $p'_f$ for potential fluidisation.

The second part 42B of the housing is also linked, by means of the vertical column 43, to the second channel 32 of the aero-pipe 30. When the fluidisation pressure $p'_f$ is nil, the alumina located in the second channel 32 of the aero-pipe descends by gravity in the column 43 opening out into the second part 42B of the housing, forming a natural angle of repose on the porous wall 44 whose foot does not reach the orifice 48. The outlet orifice 48 is located immediately above the level of the porous wall 44 at a distance such that it is not reached by the foot of the natural angle of repose.

When the fluidisation gas is injected into the second part 42A of the housing, the alumina of the natural angle of repose becomes fluid and the upper part 42B of the housing and the balancing column 46 fill with alumina up to a height depending on the pressure $p'_f$ of the fluidisation gas and the average density of the alumina in the balancing column. The outlet orifice 48 is provided with a nozzle 48A forming a diaphragm, whose external part is connected to the aero-guide 50 which feeds the gas treatment reactor 60 in alumina.

The fluidisation gas is sent through the tube 45 and the pressure level $p'_f$ is measured by means of a valve 72. The gas diffuses through the porous wall 44 towards the first part 42B of the housing.

Each hyperdense fluidised meter 40 possesses its own adjustment means 72 for the pressure $p'_f$, which allows great operational flexibility, each of the gas processing reactors 60 thus being supplied with alumina at a controlled flow rate, adapted to the flow of gas to be processed in this reactor.

It is this aero-pipe 30 which acts as distributor, the distribution function being carried out in delocalised fashion. The aero-pipes 20 and 30 possess a second channel—intended for the circulation of the pulverulent material, with a large cross-section: if it is rectangular, it is typically at least 400 mm*200 mm, which allows circulation of the alumina with a flow rate able to reach 5 to 50 tons/hour, according to needs and the fluidisation pressure used. The upstream aero-pipe 20 is connected to a storage tank with a capacity of more than 10 000 tons.

In this way, it can always remain almost full, such that any displacement of pulverulent material is only carried out by the climbing up of micro-slides.

Each hyperdense fluidised meter 40 is placed close to each gas treatment reactor 60: in this way the aero-guide 50 remains short and the difference of level imposed by the minimum slope of 6° of said aero-guide 50 remains low.

As in WO99 58435, a fluidisation gas bubble was created in the upper part 36 of the aero-pipe 30. In this way, the fluidisation gas can circulate more easily, thus improving the potential fluidisation conditions which must be fulfilled in any part of the aero-pipe and simplifying the division and distribution of the alumina in the different downstream conveyors.

Advantages suppression of the weight flow-meter upstream from the distribution device possibility of controlling the flows at any point absence of moving mechanical parts (valves, closure shutters etc.) which cause blocking or stopping for maintenance or replacement due, in particular, to wear because of the abrasive nature of the pulverulent material flow adjustment facilitated very low energy consumption.

The invention claimed is:

1. A method for conveying a pulverulent material enabling division of the pulverulent material from a single storage facility among multiple outlets with a controlled flow rate in each of the outlets, comprising the steps of:

linking the storage facility and the outlets with at least one aero-pipe, with a hyperdense fluidized meter connected between the aero-pipe and each of the outlets, the aero-pipe being disposed either horizontally or slightly inclined, and comprising a first channel for circulation of a gas, a second channel for conveying the pulverulent material, and a common porous wall being disposed between first and second channels, the first channel comprising at least one gas feed tube for producing a gas pressure $p_f$ for potentially fluidizing the pulverulent material in the second channel, and the second channel comprising at least one balancing column with a filling height balancing the pressure $p_f$ of the potential fluidization gas, said hyperdense fluidized meter comprising a housing, a supply column for feeding the housing with pulverulent material from said second channel, a balancing column and an evacuation means for the pulverulent material, said housing comprising first and second parts separated by a porous wall, the first part for circulation of potentially fluidizing gas and provided with at least one gas feed tube for producing a pressure $p'_f$ for potentially fluidizing the pulverulent material in the second part, and the second part for circulation of the pulverulent material from said supply column, to said evacuation means for supplying the pulverulent material to an outlet and to said balancing column that has a filling height for balancing the pressure $p'_f$, the evacuation means comprising an orifice and an outlet nozzle with an internal diameter greater than that of the orifice, and being disposed at a distance from the supply column sufficient that in the absence of fluidization, it cannot be reached by the foot of the natural angle of repose, and conveying the pulverulent material from the storage facility to each of the outlets by supplying potentially fluidizing gas under controlled pressure $p_f$ to the first channel and under controlled pressure $p'_f$ to the first part, thereby potentially fluidizing the pulverulent material in the second channel and the second part.

2. Method according to claim 1, wherein, for each hyperdense fluidized meter there exists an individual adjustment means for the fluidization pressure $p'_f$.

3. Method according to claim 1, wherein a bubble of gas under pressure is created in the upper channel of the aero-pipe.

4. Device for conveying a pulverulent material enabling division of the pulverulent material from a single storage facility among several outlets with a controlled flow rate in each of the outlets, comprising:

at least one aero-pipe, and a plurality of hyperdense fluidized meters for feeding each of the outlets, branched off the at least one aero-pipe, said aero-pipe being horizontal or slightly inclined, and comprising a first channel for circulation of a gas, a second channel for circulation of the pulverulent material, and a common porous wall between the first and second channels, the first channel being provided with at least one gas feed tube for producing a pressure $p_f$ for potentially fluidizing the pulverulent material in the second channel, and the second channel being provided with at least one balancing column having a filling height balancing the pressure $p_f$ of the potentially fluidizing gas, the fluidized meters each comprising a housing, a supply column for supplying the housing with pulverulent material from the second channel of the aero-pipe, a balancing column and an evacuation means for said pulverulent material, the housing comprising first and second parts and a porous wall separating the first and second parts, the first part for circulation of the potentially fluidizing gas being provided with at least one gas feed tube for producing a pressure $p'_f$ for potentially fluidizing the pulverulent material in the second part, and the second part for circulation of said pulverulent material being connected to the supply column, to the evacuation means and to the balancing column having a filling height for balancing the pressure $p'_f$ of potential fluidization, the evacuation means comprising an orifice and an outlet nozzle with internal diameter greater than that of the orifice and being disposed at a distance from the supply column sufficient that, in the absence of fluidization, it cannot be reached by the foot of the natural angle of repose.

\* \* \* \* \*